UNITED STATES PATENT OFFICE.

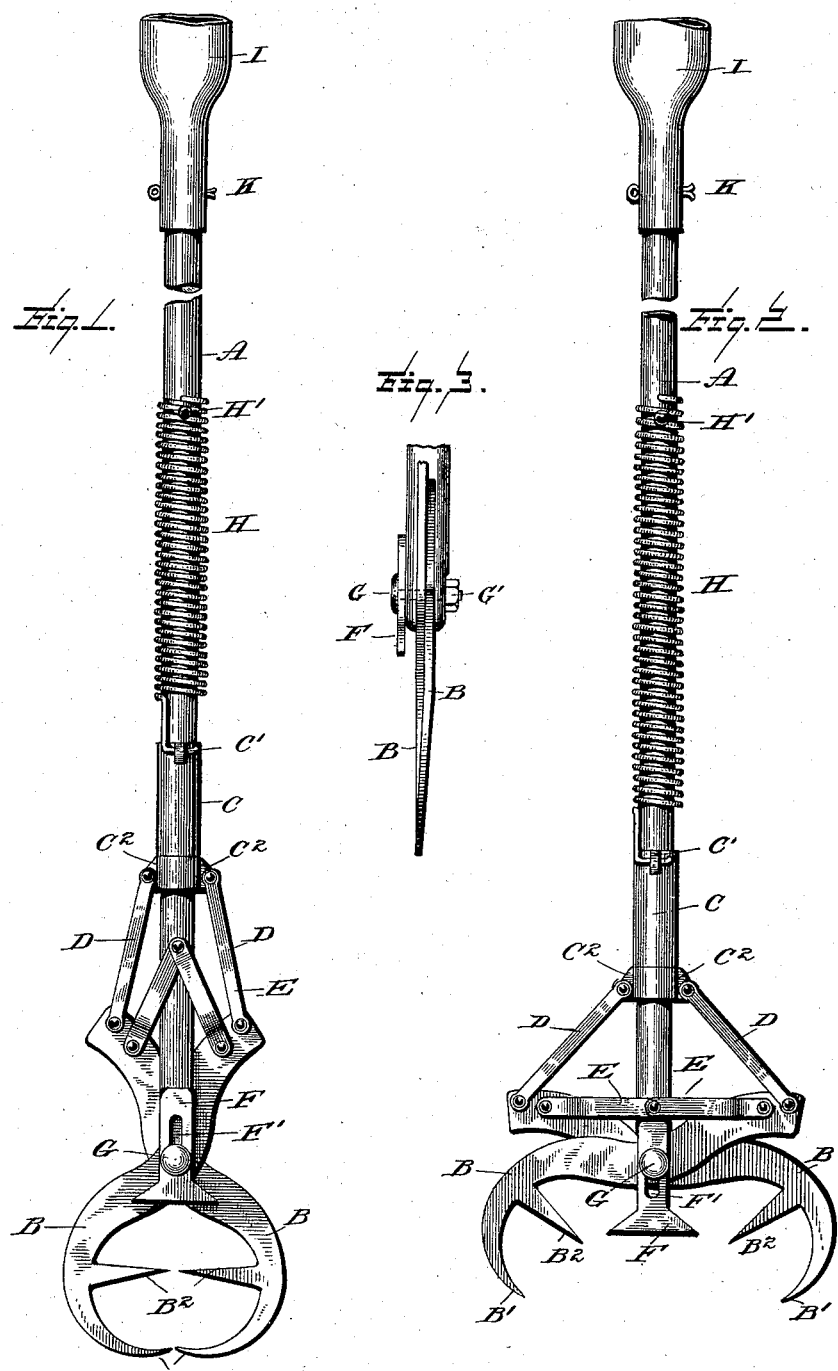

WILLIAM TABER, OF CLINTON CORNERS, NEW YORK, ASSIGNOR OF TWO-THIRDS TO CHARLES HAIGHT GRIFFEN, OF SAME PLACE.

FISH-SPEAR.

SPECIFICATION forming part of Letters Patent No. 406,546, dated July 9, 1889.

Application filed March 9, 1889. Serial No. 302,728. (No model.)

*To all whom it may concern:*

Be it known that I, WILLIAM TABER, a citizen of the United States, residing at Clinton Corners, in the county of Dutchess, State of New York, have invented certain new and useful Improvements in Fish-Spears, of which the following is a specification, reference being had therein to the accompanying drawings.

The object of my invention is to provide a fish-spear which shall have a positive and smooth grip, shall be easily set, and which shall be certain in action, besides being adjustable to be used with fishes of various sizes.

To this end I have devised the spear constructed as herein described, the novel features of which are particularly set forth in the claims at the end of the specification.

In the drawings, Figure 1 is a side elevation of my spear in its closed position. Fig. 2 is a side elevation of the same when open and ready for use. Fig. 3 is an edge view of the end of my spear, showing the lock on the posterior side of the same for tightening the pivot on which the trip-link slides.

A represents the stem of my spear, which may be made of any convenient dimensions, and which is cleft at its extremity, as shown in Fig. 3, to receive the pivoted clutches B. These latter are pivoted within this cleft by means of the pin G, as shown.

Sliding upon the stem A is the sleeve C, bearing an eye C' and two ears C². The posterior extremities of the clutches are carried back, as shown in Fig. 1, and are connected with the two ears on the sleeve by the straining-links D. Two locking-links E are fastened pivotally to the extremities of the clutches, as well as to each other. These links are so placed as to slide over the surface of the stem between the two positions shown in Figs. 1 and 2.

One end of the pivot G is squared and surmounted by a round rivet end, as shown in Figs. 1 and 2. Riding upon this squared portion is a slotted trip-link having a spreading end, as shown at F. The slot F' is just large enough to allow of the links sliding easily on the squared end of the pivot G. This trip-link is in the same plane with the locking-links E. On the end of the pivot G, which link is screw-threaded for insertion through the stem, is a nut, which, when screwed down tight, holds the pivot in any desired position without necessitating the tightening of said pivot and the jamming of the trip-link.

Winding around the stem of the spear is a spiral spring H, which is attached at one end to the eye C', and at the other has an interposed pin H', fastened to the stem and projecting up between two successive coils of the spring, as shown. The rear end of the stem is pierced at K for the purpose of fastening the same to a sleeve over the end of the staff of the spear by means of the spring-pin shown in Figs. 1 and 2. Other methods of fastening may of course be employed; but I prefer that shown in these drawings for purposes of convenience and security.

The method of using my spear will then be as follows: Grasping the sleeve C just above the top of the spring the operator pushes it forward suddenly, thus bringing the pivot between the locking-links into contact with the trip-link, and the latter is thus thrown forward, as shown in Fig. 2, until the rear end of the slot is in contact with the pivot G. The spear is proportioned so that in this position of the trip-link the locking-links are a little forward of the common line joining their points of attachment to the rear ends of the clutches, and said links thus abut against the trip-link, preventing their further movement forward. Thus the sleeve C is locked in this forward position, as shown in Fig. 2. In this position the spring is under tension. Now by projecting the spear in this condition against the back of a fish in the ordinary manner the trip-link is thrown backward by the resistance of the fish's back and of the water, and the lock between the links E broken. This allows the tension of the spring to come into play, and through the medium of the links D to thrust the outer ends of the jaws together with great violence, causing the points B' and B² upon said clutches to enter the sides of the fish. Of course one spike would be sufficient to hold the fish; but it is desirable to have at least two of such spikes, for the reason that it will hold him in a horizontal position in spite of his struggles and enable the fisherman to remove him with greater ease by drawing the sleeve forward again against the action of the spring.

The tension of the spring H may be varied with great ease by simply removing the forward end of the same from the eye on the sleeve and twisting the spring in such a direction as will screw it farther backward or forward upon the pin H′, thus shortening the spring or lengthening it, as desired, for a greater or a less tension.

I do not wish to be understood as limiting myself to the exact construction shown and described, as it will be possible to vary many of the minor details of my device without departing from the spirit of my invention.

What I claim is—

1. In a fish-spear, a cleft stem, a pair of spiked clutches pivoted to one another and to said stem within said cleft, a trip-link between said clutches and sliding upon said pivot, and locking-links pivoted to said clutches for the purpose of holding them open, in combination with a sleeve sliding upon said stem and attached to said clutches at their rear ends by means of links, and a spring attached to said stem and to said sleeve, substantially as described.

2. In a fish-spear, a cleft stem, a pair of spiked clutches pivoted to one another and to said stem within said cleft, and means for closing said clutches upon the fish, in combination with a sleeve, as I, fastened to the end of the staff of said spear, and a spring-pin, as K, passing through the rear end of said stem and the front end of said sleeve, substantially as described.

3. In a fish-spear, a cleft stem, a pair of spiked clutches pivoted to one another and to the stem within said cleft, said clutches being prolonged backward, and locking-links attached to said backward prolongations for the purpose of holding the clutches open, in combination with a sleeve sliding upon said stem and attached to said backward prolongations, a pin fastened to said stem, and a spiral spring attached to said sleeve, two coils of said spring embracing said pin, substantially as described.

4. In a fish-spear, a cleft stem, clutches bearing two spikes, said spikes being in the same plane, said clutches pivoted to one another and to the stem within said cleft, and means for closing said clutches upon the fish, substantially as described.

5. In a fish-spear, a cleft stem, a pair of spiked clutches pivoted to one another and to said stem within said cleft by means of a pivot having a screw-thread for insertion in said stem and a squared end, a nut screwing onto the other end of said pivot, a pair of locking-links attached to said clutches and to each other by means of pivots, and a trip-link provided with a slot sliding upon said squared end of the pivot and in the path of said locking-links, in combination with a sleeve sliding upon said stem pivotally attached to said clutches, and a spiral spring attached to said stem and to said sleeve, substantially as described.

In testimony whereof I affix my signature in presence of two witnesses.

WILLIAM TABER.

Witnesses:
G. H. McLEAN,
T. H. LEE.